United States Patent [19]
Eggenberger et al.

[11] 3,729,283
[45] Apr. 24, 1973

[54] CLOSING, LOCKING AND PRESTRESSING DEVICE FOR CASTING MOLDS

[76] Inventors: Ulrich Eggenberger, Bichwilerstrasse, Oberuzwil; Heinz Nef, Dammweg, Uzwil, both of Switzerland

[22] Filed: Mar. 22, 1971

[21] Appl. No.: 126,567

[30] Foreign Application Priority Data

Mar. 20, 1970 Switzerland..................4230/70

[52] U.S. Cl. ..................425/450, 425/242, 425/408
[51] Int. Cl. ..........B29c 1/16, B29c 3/02, B29c 5/00
[58] Field of Search.......................425/47, 178, 186, 425/190, 408, 450, 353, 451, 242

[56] References Cited

UNITED STATES PATENTS

| | | | |
|---|---|---|---|
| 2,862,238 | 12/1958 | Cuzzi | 425/450 |
| 3,263,277 | 8/1966 | Ohlendorf et al. | 425/450 |
| 3,289,252 | 12/1966 | Bromleg | 425/450 X |
| 3,351,982 | 11/1967 | Jackson et al. | 425/450 |
| 3,359,598 | 12/1967 | Bucy | 425/450 X |
| 3,372,433 | 3/1968 | Nouel | 425/450 |
| 3,590,437 | 7/1971 | Annis, Jr. et al. | 425/450 X |

*Primary Examiner*—Robert L. Spicer, Jr.
*Attorney*—John J. McGlew and Alfred E. Page

[57] ABSTRACT

The device is usable for casting molds, particularly for injection and pressure molding, of the type having a fixed mold part carrier, a supporting part having a shifting device attached thereto, at least two guides extending from the fixed carrier to the supporting part, a mold part carrier movable by the shifting device along the guides and anchorable thereon, and a hydraulic prestressing device acting through the guides upon the two mold part carriers. Two guide bars extend parallel to the shifting device through the supporting part in guided relation therein, and are connected to the movable mold part carrier. At least one stop plate is movable on the shifting device and is connected to the two guide bars, and two mechanical stops provided on opposite sides of the stop plate are cooperable therewith. Each guide bar is provided, between the supporting part and the movable mold part carrier, with a piston and also supports a movable cylinder enclosing the piston. Each cylinder is connected to an ejector plate, and cavities on opposite sides of the piston, inside the associated cylinder, are controllably chareable hydraulically. The guides, adjacent that surface of the fixed mold part carrier away from the casing mold, provided prestressing pistons each movable in a cylinder on the fixed mold part carrier.

9 Claims, 2 Drawing Figures

3,729,283

CLOSING, LOCKING AND PRESTRESSING DEVICE FOR CASTING MOLDS

BACKGROUND OF THE INVENTION

At a relatively early stage in the development and introduction of metal pressure casting and plastic injection molding, for the production of parts of any shape in spatially defined, mold-like casting guides, permitting the production of thousands of identical parts, the difficulty of using presses such as used previously for casting molding was recognized. This difficulty is that, with increasing size of the parts to be manufactured by pressure or injection molding, longer and longer strokes of the mounting parts accompanying the mold halves are required. Consequently, the guide bars extending between the fixed mold part carrier and a supporting part, and which support the shifting and prestressing device, and along which guide bars the movable mold carrier moves, become longer and longer. This leads to greater and greater elongations of these guide bars during the prestressing period and during the casting operation.

Consequently, ways were sought to greatly reduce this elongation, for example, to have the actual mold tension and its reactive force in tension members become active, by suitable measures, between a fixed and movable mold part carrier only. Thus, suggestions have been made, where mold carries movable relatively to each other were involved, to bring into mutual, force-closing engagement between the fixed and movable mold part carrier, several, and in certain cases a large number of, short tension rods by a suitable mechanical means, and then to build up only through the short tension rods the great mold prestressing forces by using multi-part mold part carriers presenting the locking elements on the one hand and mold mounting plates shiftable relative to the former on the other hand.

Similar suggestions have again been made very recently, all aimed at making the balance of forces economical in such machines by reducing the maximum possible elongations of tension rods. The suggestions made so far have disadvantages which must be overcome. In the devices already proposed, the masses to be moved are very great, in that the locking and prestressing elements are disposed in the movable mold carrier.

The disadvantage of another device, which is also known, is that the tension rods between the movable and the fixed mold carrier always extend out of one of them so that special and very expensive measures must be taken to guarantee the free motion of the movable part and also coupling without interference.

There has also been proposed a force-closing, rather than a form-closing, locking action of a movable part to a fixed part. However, purely force-closing locking systems have the disadvantage that the transmittable force is limited by the coefficient of static friction alone, so that, in connection therewith, a locking force more than twice as great as the tension acting thereupon must be expended, and that the danger of an accident, in case of failure of an element used to produce the static friction, is extreme.

SUMMARY OF THE INVENTION

This invention relates to closing, locking and prestressing devices for casting molds and, more particularly, to such a device assuring maximum operating speed and operating safety with a minimum of equipment expense, and maintaining an optimum balance of forces while overcoming disadvantages encountered heretofore.

The invention device is particularly designed for casting molds, particularly for injection and pressure molding, of the type having a fixed mold part carrier, a supporting part with a shifting device attached thereto, at least two guides extending from the fixed mold part carrier to the supporting part, with a movable mold part carrier movable along the guides by means of the shifting device and anchorable to the guides, and with a hydraulic prestressing device acting upon the mold part carriers through the guides, for pressing the mold parts together.

In accordance with the invention, two guide bars extend parallel to the shifting device and through the supporting part in guided relation therein, and are connected to the movable mold part carrier. At least one stop plate, movable on the shifting device, is connected to the two guide bars. On the shifting device, on opposite sides of the stop plate, there are two mechanical stops which are connectable to the stop plate. Each of the guide bars is provided, between the supporting part and the movable mold part carrier, with a piston supporting a movable cylinder enclosing the cylinder. Each of the cylinders is connected to an ejector plate, and controlled hydraulic pressure can be admitted into cavities on opposite sides of the piston inside the cylinder on each guide bar.

This expedient leads to a decisive reduction of the moved masses, due to the multiple function of certain machine elements, to unhindered motions of the movable mold part carriers due to the long guide lengths provided therefor, and to quick motions of all closing, locking and prestressing operations due to the use of hydraulic elements having small pressure medium volumes.

In the area of the fixed mold part carrier, each guide may be connected to a prestressing piston movable in a cylinder provided on the fixed mold part carrier and, therefore, to the supporting part connected to the opposite ends of the guides. The two mechanical stops may be movable along the shifting device in order to limit both the opening motion and the closing motion. The mechanical stops may be nuts, adjustable on an external thread on the cylinder of the shifting device and which, in a very simple manner, make possible assuring agreement with the locking elements relative to the guides. The nuts, usable as mechanical stops, may be in driving connection with a transmission for adjusting purposes.

Two mechanical stops may be fixed at opposite ends of the shifting device and, between them, there may be two stop plates adjustable along the guide bars and connectable to the fixed stops. At least one of the prestressing pistons may be connected to the guides by means of a threaded connection, and present gear teeth as part of a transmission between a driving element and the prestressing piston. This provides for a very simple pulling out of the respective guide to facilitate clamping in place the casting mold. The driving element, and a part of the transmission connected thereto and in engagement with the prestressing piston, may be designed in the form of an attachable unit.

An object of the invention is to provide an improved closing, locking and prestressing device for casting molds, particularly for injection and pressure molding.

Another object of the invention is to provide such a device which assures maximum operating speed and operating safety with the minimum of equipment expense.

A further object of the invention is to provide such a device which maintains the optimum balance of forces while overcoming disadvantages encountered in prior art devices.

For an understanding of the principles of the invention, reference is made to the following description of a typical embodiment thereof as illustrated in the accompanying drawing.

DESCRIPTION OF THE PREFERRED EMBODIMENT

Figure 1:
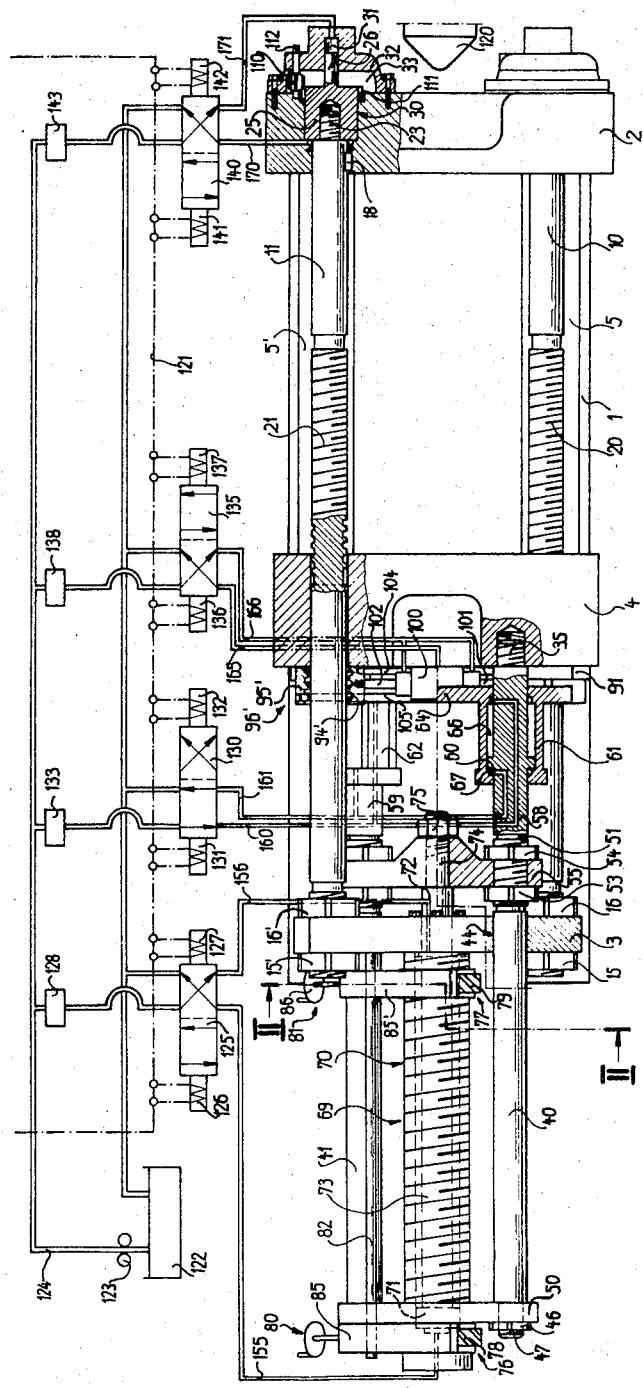
FIG. 1 is a plan view, partly in sections, of a closing, locking and prestressing device embodying the invention.
Figure 2:
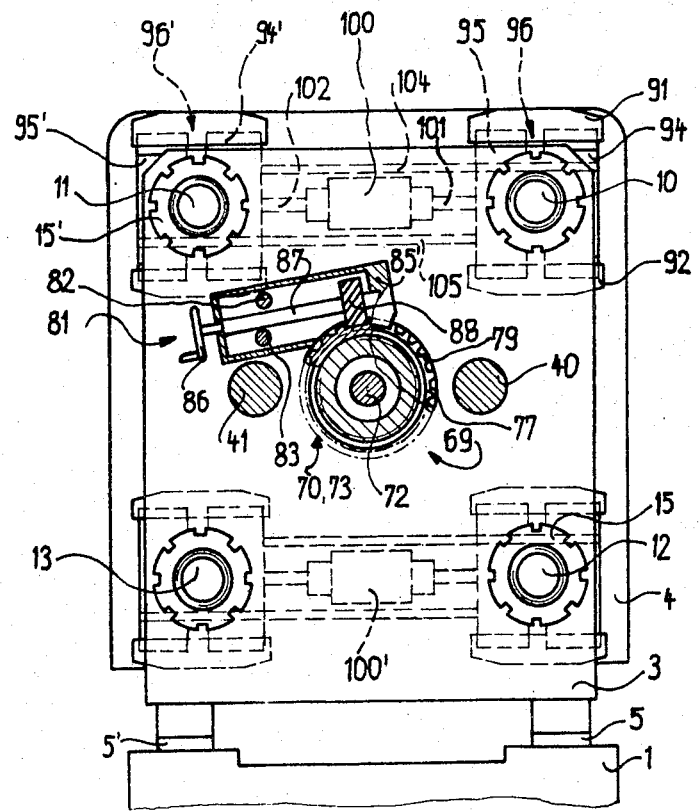
FIG. 2 is a transverse sectional view taken along the line II—II of FIG. 1.

Referring to FIGS. 1 and 2, the base plate 1 has connected thereto a fixed mold part carrier 2 and supports guide bars or rails 5 and 5' for a movable mold part carrier 4. Movable mold part carrier 4 is disposed between a supporting part 3, on base 1, and which is remote from fixed mold part carrier 2. Guides 10, 11, 12 and 13 are attached to supporting part 3 by respective pairs of nuts such as 15, 16 and 15', 16'. A portion of each guide 10, 11, 12 and 13, especially in the range of motion of movable mold part carrier 4, is designed with a thread such as 20, 21, which is preferably a square or Acme thread.

The ends of the guides 10–13 remote from their ends anchored in supporting part 3 end in respective threaded bolts 23 through the medium of which respective screw-on prestressing pistons 25 are connected to each guide 10–13. In coaxial relation with the respective guides 10–13, and pointing away from the guides, each prestressing piston 25 supports a return piston 26. A respective cylinder for each prestressing piston 25 is provided on fixed mold part carrier 2 by means of a cylindrical bore directly in the mold part carrier. Each prestressing piston 25 has operatively associated therewith a respective return piston 26 in a respective return cylinder 31 in a hood 32, each hood being connected to fixed mold part carrier 2 and enclosing a free space 33 for the axial motion of the associated prestressing piston 25.

In movable mold part carrier 4, there are anchored, by appropriate, threaded pins 35, at least two guide bars 40 and 41 which extend backwards through guide bores 44 in supporting part 3. The left ends of guide bars 40 and 41 are provided with threaded stubs 47 which receive nuts 46 anchoring a stop plate 50.

Between movable mold part carrier 4 and supporting part 3, each guide bar 40, 41 is formed with a threaded section for the accommodation of two nuts 53 and 54, which connect a shifting yoke 55 with the guide bars 40, 41. Between threaded sections 51 of the respective guide bars and the respective threaded pins 35 threaded into movable mold part carrier 4, there are formed appropriate cylindrical sections 58, 59 each having a cylindrical or annular portion 60 serving as a piston. Each cylindrical section 58, 59 supports a respective ejector cylinder 61, 62 receiving the respective piston 60, and an ejector plate 64 is connected to ejector cylinder 61, 62.

Supporting part 3 supports a shifting device 69 comprising a cylinder 70, a piston 71 movable in cylinder 70 and a piston rod 72 connected to piston 71 and extending into the area between upporting part 3 and movable mold part carrier 4, the cylinder 70 having an external thread 73. Shifting yoke 55 is connected to the free end of piston rod 72 by a nut 75 on a threaded supporting pin 74.

The external thread 73 on cylinder 70 of shifting device 69 is engaged by two stop nuts 76 and 77 having respective external teeth 78 and 79 each correlated with a respective positioning device 80 and 81. Each positioning device 80, 81, having a respective housing 85, 85', is movable along supporting rods 82, 83 and has a pinion 88 which can be rotated by a hand wheel 86 through a shaft 87. Each pinion 88 is in driving connection with the external teeth 78, 79 of the respective stop nut 76, 77.

In the area of guides 10–13, two shifting guides 91, 92, connected to movable mold part carrier 4, support two halves 94, 95 and 94', 95', respectively, of respective splitnuts 96, 96', whose threads are formed for cooperation with the threads 20, 21 on guides 10–13. To open and close any two split nuts 96, 96', there is provided, for each pair of split nuts, a respective double cylinder 100, 100' with two pistons (not shown) movable therein, and respective piston rods 101, 102 each connected to an associated piston. The half 95 of strip nut 96 is connected to piston rod 101, and a connecting rod 105 extends from half 95 through half 94' of the other split nut 96', in the area of double cylinder 100 and guide 11, to a rigid connection with half 95'. On the other hand, piston rod 102 is in fixed connection with half 94' of split nut 96 and, through a connecting rod 104, with the half 94 of split nut 96. A corresponding locking arrangement associated with double cylinder 100' is correlated with guides 12 and 13. The double cylinders 100, 100' are mounted on movable mold part carrier 4. Each of the guides 10–13 carries a key guided in a corresponding keyway in fixed mold part carrier 2.

A respective pinion 110 is mounted in each hood 32, and its teeth cooperate with external teeth 111 on prestressing pinion 25. Externally of hood 32, a respective shaft 112, required for mounting each pinion 110, is provided with a hex for the accommodation of a hand or motorized tool to rotate the associated pinion 110.

The plastifier and injection unit 120 needs no detailed description because it does not form a direct part of the invention. It may be moved, in a known manner, relative to fixed mold part carrier 2 in order to be brought into close contact with the sprue in a divisible casting mold which is partly attached to carrier 2 and partly attached to carrier 4.

The most essential control elements comprise a general machine control 121 to which are connected the control coils 126 and 127, 131 and 132, 136 and 137, and 141 and 142 of the respective valves 125, 130, 133 and 140. A pump 123 pumps hydraulic pressure medium from a tank or reservoir 122 into a pressure line 124. Interposed between pressure line 124 and valves 125, 130, 135 and 140 there are respective correlated control devices 128, 133, 138 and 143.

A mold closing stroke line 155 extends from valve 125 to the left end of cylinder 70, and a return stroke line 156 extends between valve 125 and the right hand end of cylinder 70. An ejector line 160 extends from valve 130 to the cylindrical sections 58, 59 and through these into the front cylinder cavities 66 of ejection cylinders 61, 62. A return line 161 extends from valve 130 to cylindrical sections 58, 59 and through these into the rear cylinder cavities 67 of ejection cylinders 61, 62. A nut locking line 165 extends from valve 135 to the two double cylinders 100, 100′, into their central regions, and a nut on locking line 166 extends from the outer ends of double cylinders 100, 100′ to valve 135. A prestressing line 170 extends from reversing valve 140 into the cylinder bores 30 of all the prestressing pistons 25 on the guides 10–13 in fixed mold part carrier 2, and a return line 171 extends from all the return cylinders 31, in hoods 32, to valve 140.

Closing, locking and prestressing devices for casting molds are essentially operated purely hydraulically. At the start of setting up, valve 130 is reversed so that pressure medium is supplied into the cylinder bore 67 of ejection cylinder 61, 62, moving these cylinders away from movable mold part carrier 4 to bring ejector plate 64 into its rear or rest position. After the parts of the casting mold formed with the mold cavities are attached to the respective mold part carriers 2 and 4, and after valve 125 is reversed, pressure medium is supplied by pump 123, in the quantity prescribed by control device 128, to closing stroke line 155 into cylinder 70 of shifting device 69. Piston 71 in cylinder 70 is moved in the direction of its fastening to mold supporting part 3. Through piston rod 72, shifting yoke 55 and cylindrical sections 58, 59 of guide bars 40 and 41, movable mold part carrier 4 is moved toward fixed mold part carrier 2 until the two halves of the casting mold rest against each other.

When setting up the machine, for example when the casting mold is closed for the first time, this closing motion proceeds slowly and with little pressure in the hydraulic system, especially in closing stroke line 155. By reversing valve 135, pressures medium is supplied through nut locking line 165 between the two pistons in each double cylinder 100, 100′, so that the latter move the respective piston rods 101, 102 and thus, through connecting rods 104, 105, the correlated halves 94 and 95′ of nuts 96 and 96′ which are assigned to the guides 10, 11 and, similarly, to the guides 12, 13. This determines the possibility of cooperation of the split nuts with threads 20, 21 on guides 10, 11, 12 and 13. If this is not possible immediately, the movable mold part carrier 4 is moved back until the split nuts 96, 96′ close completely on all of the guides 10–13. In this position, positioning device 81 is adjusted so that its stop nut 77 rests closely against stop stop plate 50 on guide bars 40, 41. Positioning device 80, with stop nut 86, is positioned to the required return stroke up to the desired opening distance between the halves of the casting mold. These positions of stop nuts 76 and 77 along thread 72 on cylinder 70 determine the end positions of the closing, locking and prestressing device during its operation.

Subsequently, the operating pressures oon the pressure medium supplied to valves 125, 130, 135 and 140 are determined by the respective control devices 128, 133, 138 and 143. Valve 140 is reversed, and high pressure medium is supplied through prestressing line 170 into the bores of cylinders 30 for action upon all of the prestressing pistons 25 correlated with guides 10, 11, 12 and 13. The axial motions of pistons 25 in their associated cylinder bores 30 move the associated guides 10–13 and the support part 3 connected thereto, as well as, through split nuts 96, 96′ on movable mold part carrier 4, the mold half fastened thereto, against the half of the casting mold on fixed mold part carrier 2. The casting mold closes and is charged with the desired or prescribed prestressing force. Plastifier and injection unit 120 is placed against the sprue of the casting mold, and the casting operation, such as the injection of molten or liquid material, can take place.

After the required time for cooling the cast melt, valve 140 is switched back into the illustrated position. Pressure medium drains from cylinder bores 30, and prestressing pistons 25, under the influence of the elastic relaxation of guides 10–13, are again moved axially into cylinder bores 30, which corresponds to a motion of support part 3 and of movable mold part carrier 4 away from fixed mold part carrier 2. This motion of the prestressing pistons, together with the guides 10–13, is supported by the supply of pressure medium from return line 171 into return cylinders 31 in hoods 32, to appropriately charge return pistons 26 associated with prestressing pistons 25.

After the conclusion of this relief and return motion, which is monitored by limit switches which have not been shown, pressure medium is pumped through nut loosening line 166 into the cavities of double cylinders 100, 100′ on the sides toward their piston rods. At the same time, through reversed valve 135, pressure medium flows through nut locking line 165 into tank 122. This causes all of the split nuts 96 and 96′, correlated with the guides 10–13, to be retracted from their intimate contact with the threads 20, 21 on the guides through piston rods 101, 102 and the associated connecting rods 104, 105. At the end of this return stroke, again monitored by limit switches, valve 125 is returned into the illustrated position by appropriately energizing control windings 126, 127. Pressure medium is pumped through return stroke line 156 into the cavity of cylinder 70 on the piston rod side, and is applied to piston 71. Piston 71 moves within cylinder 70 from its position in the area of stop nut 77 toward the near stop nut 76 on external thread 73 of cylinder 70. This causes movable mold part carrier 4 to move away from fixed mold part carrier 2, due to the pin 74 on piston rod 72 carrying the nut 75 secured to shifting yoke 55 to which guide bars 40 and 41 are attached, particularly at their cylindrical sections 58 and 59. This motion is terminated by stop nut 76, against which there engages stop plate 50 on guide bars 40, 41.

During or after the motion of movable mold part carrier 4 away from fixed mold part carrier 2, valve 130 is reversed one or several times through the correlated control windings 131, 132 so that, due to such reversing pressure medium flow in cylinder bores 66, 67 of ejection cylinder 61, 62, these ejection cylinders and the ejector plate 64, with the ejectors connected thereto and extending into the casting mold, are reciprocated relative to the retracting or retracted movable mold part carrier 4. These motions are generally terminated in a rear position of ejector cylinders 61, 62 and ejector plate 64.

Often, casting molds too big to be placed on the two mold part carriers through the openings between the guides are used in injection and pressure molding machines. Pull-out guides are provided for such cases, and an example therefor is illustrated with respect to guide 11.

Movable mold part carrier 4 initially is moved as far as possible toward fixed mold part carrier 2 and, by means of split nuts 96 and 96', locked to guides 10–13. A screwing tool is placed on the hex end 112 of pinion 110 mounted in hood 132 and cooperating with the external teeth 111 on the prestressing piston 25. The screwing tool may be a hydraulic motor, a wrench, a ratchet, or the like. Turning the pinion 110 also causes the prestressing pinion 25 to turn, so that it will be removed from the threaded bolt 23. After the complete removal of prestressing piston 25, loosening of nuts 15' and 16' on guide 11 in the area of supporting part 3, and loosening of split nuts 96, 96', the preparations for pulling guide 11 out are complete.

This guide 11 can now be clamped, by a suitable clamping device, relative to movable mold part carrier 4 so as to be immovable. By charging piston 71 through return stroke line 156, movable mold part carrier 4 and, with this element, guide 11 clamped to it are moved out of the range of fixed mold part carrier 2 so that space is freed laterally to manuever a bulking casting mold between the bars. To assure unmistakeable conditions in the operation of the closing, locking and prestressing device for casting molds, a keyway is provided in fixed mold part carrier 2 and the key 18 cooperating with the former in guide 11 for the reassembly of guide 11 with prestressing piston 25.

The closing, locking and prestressing device for casting molds, embodying the invention, permits, in a surprising simple manner, purely hydraulic operation with exclusively linear motions, and also reliably form-closing locking before the build-up of the large locking forces, high motional accuracy due to very long guide lengths with the movable mold part carrier along the guide bars through the supporting part up to the stop plate in the area of the shifting device, and important simplifications of the ejector mechanism. In addition, the distances traversed by the movable mold part carrier, for closing and opening the casting mold, are adjustable so as to be accurately reproducible, due to mechanical stops in the form of the stop nuts on the shifting device and in cooperation with the stop plate.

Varying from the illustrated design, but representing a self-suggesting modification, there may be provided, at both ends of shifting device 69, particularly cylinder 70, fixed stop plates and two adjustable stops along guide bars 40, 41 for the limitation of the closing and opening motions.

In place of attachable tools, appropriately controlled fixed motors also may be associated with pinions 110 to turn these pinions.

Instead of threads on the guides 10–13, a longitudinal succession of annular grooves closed in themselves may be formed on these guides, and be correlated with cooperating sleeves on the movable mold part carrier instead of the split nuts. In this connection, it is of advantage, in certain cases, when this succession of grooves on the guides is essentially of sawtooth design, in cross-sectional view, as this design is particularly favorable from a strength point of view.

While a specific embodiment of the invention has been shown and described in detail to illustrate the application of the principles of the invention, it will be understood that the invention may be embodied otherwise without departing from such principles.

What is claimed is:

1. In a closing, locking and prestressing device for casting molds, particularly for injection and pressure molding, of the type having afixed mold part carrier, a supporting part having a shifting device attached thereto, at least two guides extending from the fixed carrier to the supporting part, a mold part carrier movable by the shifting device along the guides and anchorable thereon, and a hydraulic prestressing device acting through the guides upon the two mold part carriers, the improvement comprising, in combination, relatively elongated guide means extending parallel to said shifting device through said supporting part in guided relation therein and connected to said movable mold part carrier; at least one stop plate movable along said shifting device and connected with said guide means; mechanical stops provided on opposite sides of said stop plate and engageable therewith; said guide means being provided, between said supporting part and said movable mold part carrier, with piston means supporting movable cylinder means enclosing said piston means; an ejector plate connected to said cylinder means; and cavities in said cylinder means on opposite sides of said piston means and controllably chargeable hydraulically.

2. In a closing, locking and prestressing device, the improvement claimed in claim 1, in which said guide means comprises two relatively elongated guide bars; said piston means comprising a respective piston on each guide bar and said cylinder means comprising a respective cylinder on each guide bar and closing the associated piston.

3. In a closing, locking and prestressing device, the improvement claimed in claim 2, in which each of said guides, on that part of said fixed mold part carrier facing away from the casting mold, carries a respective prestressing piston; respective cylinders on said fixed mold part carrier each receiving a respective prestressing pinion; said support part being movable; and means connecting the opposite ends of said guides to said support part.

4. In a closing, locking and prestressing device, the improvement claimed in claim 2, in which said two mechanical stops are movable along said shifting device.

5. In a closing, locking and prestressing device, the improvement claimed in claim 4, in which said shifting device comprises an externally threaded cylinder; said mechnical stops comprising nuts threadedly adjustable along said externally threaded cylinder.

6. In a closing, locking and prestressing device, the improvement claimed in claim 5, in which said nuts have external threads; and correlated drive mechanisms in driving connection with said nuts through said external threads for adjusting said nuts along said externally threaded cylinder.

7. In a closing, locking and prestressing device, the improvement claimed in claim 2, in which said two mechanical stops are fixedly connected to said shifting device adjacent the opposite ends thereof; and two stop plates movable along said guide bars between said two mechanical stops and securable thereto.

8. In a closing, locking and prestressing device, the improvement claimed in claim 3, in which at least one of said guides is formed with a threaded bolt portion threadedly engaged with the associated prestressing piston; said associated prestressing piston being formed with teeth forming part of the transmission between the associated prestressing piston and a driving element for rotating said associated prestressing piston.

9. In a closing, locking and prestressing device, the improvement claimed in claim 8, in which said driving element and a part of the transmission in engagement with said associated prestressing piston is designed in the form of a unit attachable to the other transmission part of any of said prestressing pistons.

* * * * *